INVENTORS
MINORU SASAKI
MASAYOSHI MORITA
BY
Craig & Antonelli
ATTORNEYS

INVENTORS
MINORU SASAKI
MASAYOSHI MORITA

BY

Craig & Antonelli
ATTORNEYS

United States Patent Office 3,529,788
Patented Sept. 22, 1970

3,529,788
MAGNETIC TAPE CARTRIDGE
Minoru Sasaki and Masayoshi Morita, both % Hitachi Maxwell, Ltd., 200 Oaza-Ushitora, Ibaraki-shi, Japan
Filed June 28, 1968, Ser. No. 740,878
Int. Cl. G03b *1/04;* G11b *15/32, 23/04*
U.S. Cl. 242—199 4 Claims

ABSTRACT OF THE DISCLOSURE

A magnetic tape cartridge wherein there is provided separate lubricating sheets between the sides of the magnetic tape reels and the inner surfaces of the cartridge casing, the lubricating sheets having a base formed of kraft or art paper and at least a covering of silicone oil.

The present invention relates in general to magnetic tape recorders, and more particularly to an improved magnetic tape cartridge.

A magnetic tape cartridge, commonly referred to as a "cassette," provides a supply reel and a winding reel for the magnetic tape within an enclosed casing so that the cartridge including both reels may be engaged with the tape recorder and disengaged therefrom as a unit, thereby avoiding the need to handle the supply reel and winding reel separately or to rewind the magnetic tape prior to removal from the tape recorder in those recorders having a non-removable winding reel. The cassette type tape cartridge has proven very popular due to the efficiency and ease of use thereof, and the elimination of inherent problems in the open reels, such as accidental unwinding of the magnetic tape, increased time in threading the tape on the tape recorder, and the need to rewind the tape prior to removal from the recorder.

In the presently used tape cartridges, the spool of magnetic tape inside the cartridge case is generally provided without a flange, the sides of the cartridge case serving to confine the magnetic tape thereby eliminating the need for such flanges. However, since the sides of the cartridge case are stationary with respect to the roll of tape, the frictional resistance between the magnetic tape and the inner surfaces of the case has produced certain problems, including the need for an increased driving force for the tape spools. However, even with an increased driving force for the tape, the magnetic tape does not run as smoothly and therefore produces distortion in the recording and playback, commonly known as wow and flutter.

In addition to the need for increased driving force, the great frictional resistance between the tape roll and the surfaces of the casing is known to result in the generation of a large quantity of static electricity on the surfaces with the result that dust collected on the tape and casing produces a discharge of static electricity generating a noise signal in the tape which distorts the quality of the recording and impairs the comprehension of the playback.

In order to solve the above-mentioned problems resulting from the frictional resistance between the roll of magnetic tape and the surface of the casing, it has been proposed that there be provided a highly slippery thin sheet of plastic material, such as polyethylene, polyamide, Teflon, etc., between the inner surfaces of the casing and the rolls of magnetic tape forming the supply and winding reels. These separate sheets inserted between the magnetic tape and the surfaces of the casing provide lubricated surfaces which are designed to substantially eliminate the friction between these elements which has been responsible for the above mentioned difficulties.

Since the spaces between the surfaces of the casing and the rolls of magnetic tape are very small, the separate sheets provided therein must be as thin as 0.05–0.1 mm. The separate sheets generally have a low mechanical strength, and therefore they can be easily curled or otherwise distorted during handling or assemblying of the cartridge. Even after the lubricated sheets have been placed in position inside the casing, these sheets can be curled by a very small frictional force of the running magnetic tape, resulting in an increase in the frictional resistance for the tape which increases as the sheets become progressively more deformed until the magnetic tape is caused to stop altogether.

The slipperiness of the sheets has proved to be very advantageous in reducing the friction between the roll of tape and the casing of the cartridge; however, the surface of these sheets has heretofore exhibited a high electrical resistance such that the static electricity generated by friction between the sheets and the running tape has accumulated to the level where dust is attracted from the tape discharging static electricity which will cause a noise signal to be induced into the tape recording.

In addition to the above difficulties, the materials such as polyamide. Teflon, etc., are very high in price and therefore result in an increased cost of manufacture of the cartridge. As mentioned above, a special handling of the separate sheets is also required to prevent their curling and other distortion thereby also increasing the manufacturing costs further so that use of these sheets to solve the frictional problem has proven to be very expensive, and therefore unsatisfactory.

It is therefore a principal object of the present invention to provide a magnetic tape cartridge wherein the above mentioned problems inherent in similar devices are avoided or otherwise entirely eliminated.

It is another object of the present invention to provide a magnetic tape cartridge wherein frictional resistance between the roll of magnetic tape and the cartridge case is eliminated to the point where the tape may be moved smoothly and continuously.

It is another object of the present invention to provide a magnetic tape cartridge within which the generation of static electricity is reduced to a minimum and that static electricity which is generated within the cartridge is discharged before noise can be induced into the magnetic recording.

It is still another object of the present invention to provide a magnetic tape cartridge which is much simpler in construction and may be produced with lower manufacturing costs.

In accordance with the present invention, the problems inherent in the prior art utilizing a separate lubricating sheet are solved by using a kraft paper or art paper or by pressing a very thin film of plastic of high lubricating quality such as polyethylene, polyamide, Teflon, etc., onto both sides of a sheet of kraft paper or art paper to make a laminated sheet. The laminated sheet is glazed after soaking in or being coated with a lubricant, such as silicone oil, in order to provide a thin oil layer on the surfaces thereof. Kraft paper and art paper are stronger than a plastic sheet of the same thickness, while laminated paper is far stronger than either, having a mechanical strength which will be greatly increased by glazing it with the silicone oil. Thereafter, the cartridge assembly is simplified since the separate sheet will be capable of withstanding the necessary pressures of assembly into the cartridge case and will never be curled by frictional force of the magnetic tape. Even if the laminated paper is subject to high frictional and electrical resistance, the silicone oil will lubricate it and minimize the frictional resistance between it and the tape, providing a far better surface than the separate sheet made only of polyethylene, polyamide or Teflon. Owing to this, the magnetic tape will run more smoothly and continuously, and the quantity of static electricity stored on the separate sheet will be very small.

By pressing a very thin film of plastic onto each side of the paper to make a laminated sheet, the rough surface of the paper will be made smooth, providing a slipperier and more satisfactory surface for contact with the side of the roll of magnetic tape. The kraft paper and art paper used as the base of the separate sheet in the present invention are of very low price so that the total cost of manufacture is increased insignificantly as a result of the use thereof. Aside from this, the paper fibers always contain a proper amount of moisture, therefore the static electricity produced during the winding of the magnetic tape is maintained at an extremely low level.

These and other objects, features and advantages of the present invention will become more apparent from the following detailed description thereof, when taken in conjunction with the accompanying drawings which illustrate the various embodiments of the present invention, and wherein.

In the various views of the drawings, similar reference numerals have been used to designate the same or similar elements wherever possible.

Figure 1:
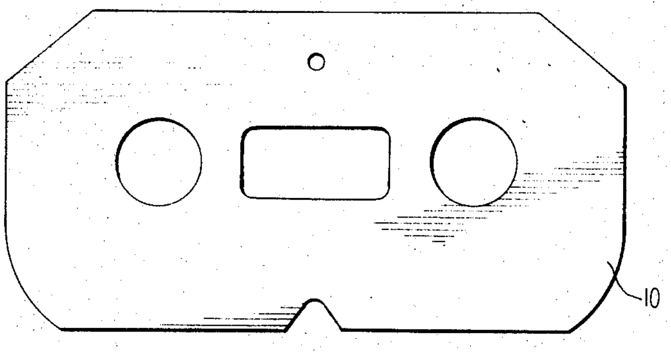
FIG. 1 is a top-plan view of a separate sheet in accordance with the present invention to be interposed between the roll of magnetic tape and the inside surface of the tape cartridge.

FIG. 1 illustrates the configuration of a separate sheet 10 for insertion between each roll of magnetic tape and the inner surface of the casing of a magnetic tape cartridge to eliminate the friction and build-up of static electricity therebetween, in accordance with the present invention. Suitable holes and notches are provided in the separate sheet for accommodating the spools for each reel in the cartridge and the indicator and other portions of the cartridge, as will be described in connection with FIGS. 3–6. However, it should be understood that the particular shape of this sheet and the various notches and apertures provided therein are to be determined in each case by the particular construction of the magnetic tape cartridge and may be varied in accordance with such considerations without departitng from the spirit of the present invention.

EXAMPLE A

The separate sheet in accordance with one embodiment of the invention is formed of kraft paper of 0.07 mm. thickness soaked in silicone oil and glazed for five minutes at 150° C. The sheet is then stamped out in the desired shape and configuration.

Figure 2:
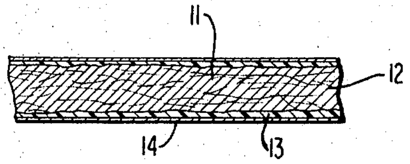
FIG. 2 is a partial sectional view through a laminated sheet in accordance with the present invention.

FIG. 2 illustrates another embodiment of the present invention wherein the separate sheet 11 to be inserted between the magnetic tape and the casing of the magnetic cartridge is formed as a laminated sheet consisting of a base 12 of kraft or art paper on both sides of which a polyethylene film 13 is provided Over the polyethylene film 13 is provided a silicone oil film 14 to ensure a highly slippery outer surface.

EXAMPLE B

As an example of the second embodiment of the present invention art paper of 0.06 mm. thickness had heat pressed on both surfaces thereof a polyethylene film of 0.005 mm. thickness. Then silicone oil was applied onto the laminated paper which was afterwards glazed for seven minutes at 120° C. and stamped out in the particular form desired for the cartridge construction. After glazing, on the surface of both the upper and lower polyethylene films, a thin silicone oil film 14 was provided.

Figure 3:
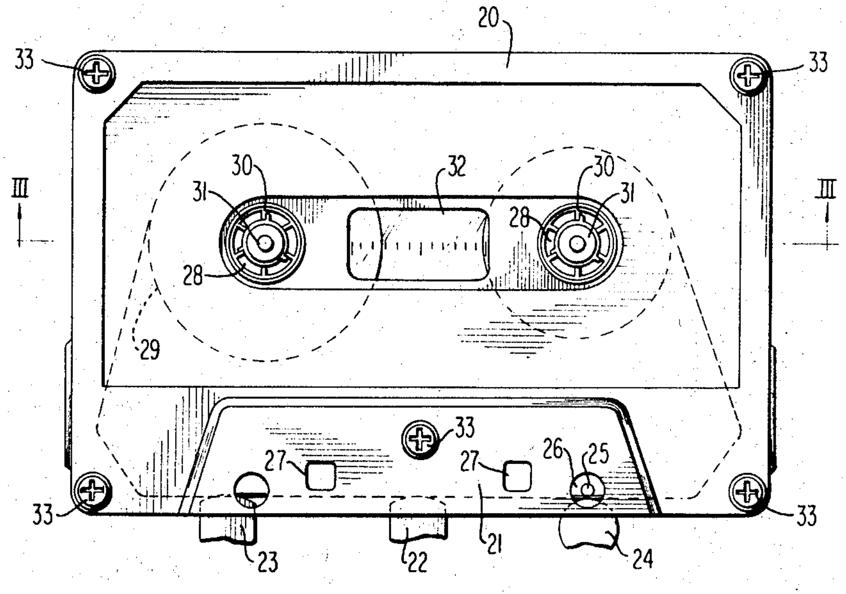
FIG. 3 is a top-plan view of a tape cartridge of the type within which the present invention is utilized.

FIG. 3 illustrates a magnetic tape cartridge which may accommodate a separate sheet between each reel of magnetic tape and the respective inner surfaces of the casing. The magnetic cartridge is formed of a casing 20 including upper and lower casing portions 20' and 20'' secured to one another by suitable fasteners, such as screws 33, etc. At the lower side of the cartridge, there is provided a trapezoidal hill shaped section which is designed to fit the recording-playing head 22, erasing head 23 and pinch roller 24 of the magnetic recorder-player. The hill shaped section 21 is provided with a round aperture 26 to receive the capstan 25 and the cartridge case 20 is provided with suitable apertures 27 which serve to correctly key the cartridge into proper position on the magnetic recorder-player. The central section of the casing 20 is provided with a pair of apertures 28 which accommodate the spools 30 of the supply and winding reels used to carry the magnetic tape 29 driven by the driving shafts 31 of the magnetic recorder-player. Between the two spools 30 there is provided a small window 32 through which the condition of the magnetic tape wound on the spools 30 can be inspected.

Figure 4:
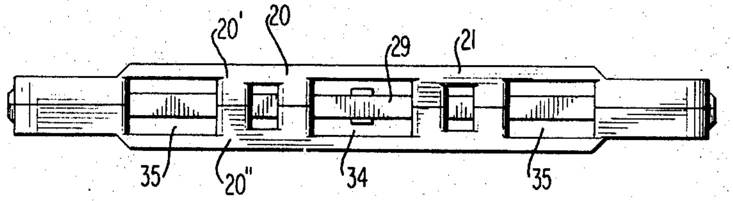
FIG. 4 is a side view of the tape cartridge of FIG. 3.

As seen in FIG. 4, at the central part of the trapezoid hill shaped section 21 there is provided a window 34 to receive the recording-playing head 22, and additional windows 35 on both sides of the window 34 to accommodate the erasing head 23 and the pinch roller 24, respectively. The magnetic tape 29 runs from one reel past the respective windows 34 and 35 to the other reel.

Figure 5:
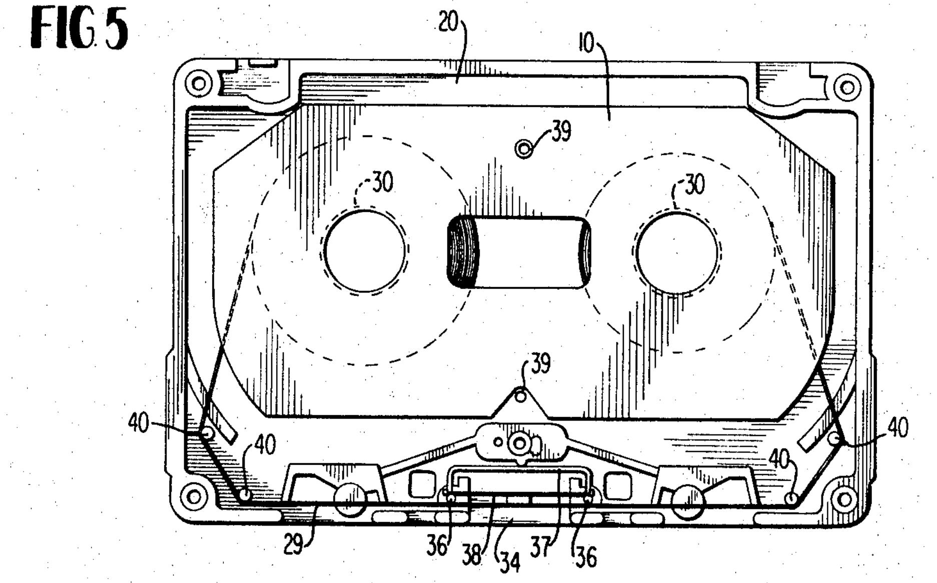
FIG. 5 is a top-view of the tape cartridge of FIG. 3 with the cover removed illustrating the invention therein.

FIG. 5 provides a plan view of the cartridge case 20 illustrated in FIG. 3 with the upper lid removed so that the details of the inside construction can be seen. On both sides of the window 34 are pins 36, above the window 34 is fixed the metallic magnetic shield 37, and between the pins 36 and the magnetic shield 37 there is provided a spring pad to press the magnetic tape 29 onto the recording-playing head 22. On the upper surface of the magnetic tape 29 wound around the spools 30 there is provided the separate sheet 10, as shown in FIG. 2, which is attached to the pin 39 in order to maintain it in position between the magnetic tape and the inner surface of the casing parts at all times. The magnetic tape 29 travelling between the respective spools 30 is supported by the guide pins 40 situated at both sides of the windows 35.

Figure 6:
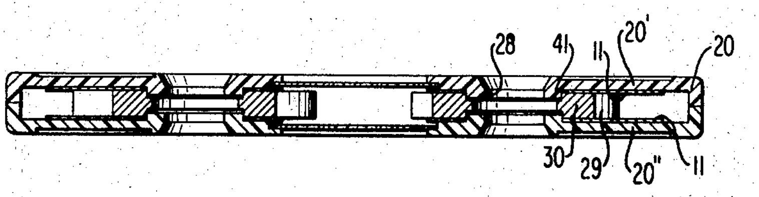
FIG. 6 is a sectional taken along lines III—III of FIG. 3.

FIG. 6 illustrates the inner construction of the magnetic tape cartridge and the manner in which the spools 30 are supported therein. The apertures 28 in the respective casing parts are turned inwardly to form rims 41 in such a way as to provide partial spindles upon which the spools can rotate. In the space between the spools of magnetic tape and the inner surface of the walls of the casing is provided the spearate sheets 10 which serve to reduce the friction between the respective parts and prevent the generation and accumulation of static electricity at these points.

While I have shown and described two embodiments in accordance with the present invention, it is understood that the same is not limited thereto but is susceptible of numerous changes and modifications as known to a person skilled in the art and I, therefore, do not wish to be limited to the details shown and described herein, but intend to cover all such changes and modifications as are encompassed by the scope of the appended claims.

We claim:

1. In a magnetic tape cartridge for a tape recorder including at least one reel of magnetic tape and a casing enclosing said reel, a sheet interposed between said reel and the inside wall of said casing comprising a piece of kraft paper which includes a coating of synthetic organic material film on at least the inside surface of said kraft paper and a glaze of silicone oil being provided over said coating of organic material film.

2. Method for producing a lubricating sheet for use in magnetic tape cartridges comprising soaking a sheet of kraft paper in silicone oil, then glazing the sheet of kraft paper for several minutes at a temperature between 100° C and 150° C, and stamping the sheet of kraft paper in a desired shape and configuration.

3. Method as defined in claim 2 further including prior to soaking heat pressing a film of synthetic organic material on the surfaces of said sheet.

4. Method as defined in claim 3 further including applying a thin silicone oil film to at least one surface. after the step of glazing.

References Cited

UNITED STATES PATENTS

| | | | |
|---|---|---|---|
| 2,940,875 | 6/1960 | Smith et al. | 117—161 |
| 3,027,110 | 3/1962 | Andrews | 242—55.13 |
| 3,259,331 | 7/1966 | Liddle | 242—55.13 |

LEONARD D. CHRISTIAN, Primary Examiner

U.S. Cl. X.R.

117—161